Figure 2:
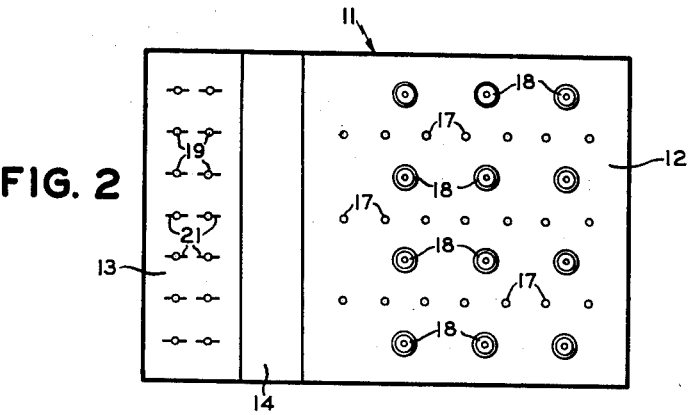

June 18, 1963

C. K. MADER 3,094,391

HYDROCARBON CONVERSION

Filed April 22, 1960

*INVENTOR.*
CHARLES K. MADER

BY *S. H. Palmer*
*John C. Quinlan*

ATTORNEYS

United States Patent Office 3,094,391
Patented June 18, 1963

3,094,391
HYDROCARBON CONVERSION
Charles K. Mader, Cold Springs, N.Y., assignor to The M. W. Kellogg Company, Jersey City, N.J., a corporation of Delaware
Filed Apr. 22, 1960, Ser. No. 24,064
14 Claims. (Cl. 23—212)

The present invention relates to method and means for conducting high-temperature endothermic hydrocarbon conversion reactions. In a particular aspect, the invention relates to process and apparatus for the catalytic steam reforming of vaporous hydrocarbons in the production of hydrogen and carbon monoxide for subsequent use, such as in the direct reduction of iron oxide to produce sponge iron or in the synthesis of ammonia, oxygenated organic compounds and the like.

A number of endothermic hydrocarbon conversion processes which proceed at appreciable rates only at elevated temperatures are commercially important. For example, the steam pyrolysis of vaporous hydrocarbons to produce olefins is normally conducted at temperatures of 1100° F. to 1600° F. The catalytic reforming of relatively low-octane materials to produce relatively high-octane materials in the presence of hydrogen normally proceeds at temperatures of the order of 900° F. In the case of catalytic steam reforming of hydrocarbons to produce hydrogen and carbon monoxide, temperatures in excess of 1000° F. are normally required. Since all of these processes are endothermic in nature and occur at appreciable rates only at elevated temperatures, tubular furnaces can be used to add heat continuously to the reactants in the tubes to maintain or increase their elevated temperature while the endothermic conversion reaction proceeds.

Unfortunately, however, the use of tubular furnaces to carry out high-temperature endothermic hydrocarbon conversion as practiced heretofore has occasioned some difficulties as can be illustrated by consideration of typical conditions employed in a furnace in which the catalytic steam reforming of methane to produce hydrogen and carbon monoxide is conducted. Typically, natural gas is preheated to a temperature of about 1000° F. and is introduced together with steam into a plurality of catalyst-packed vertical tubes disposed in the furnace to be heated by the radiant heat of a burning fuel. In order to supply the heat of reaction and to attain an outlet temperature of about 1500° F., tube wall temperatures above about 1600° F. are maintained and the hot combustion products leave the reaction radiant-heating section of the furnace at about 2100° F. Under these conditions the efficiency of the furnace is only about 40% from the standpoint of utilization in the reaction of the heat released by the combustion of the fuel. In order to obtain a reasonable overall furnace efficiency, the hot combustion products from the reaction radiant-heating section are flowed through various convection-heating sections of the furnace to preheat the gas feed and to generate steam before passage to the stack. In order to make efficient use of the steam thus generated, steam must be used as a principal source of power in the associated plant thereby precluding in some instances the use of electric motors for pumps, etc. Furthermore, from the standpoint of fuel consumption per unit volume of reforming effluent produced, fuel requirements are very great. In some areas where fuel is relatively scarce and therefore expensive and where electric power is more readily available, the foregoing incidents of the operation of reforming furnaces as practiced heretofore are sufficient to render the entire process commercially impractical.

Regardless of the particular high-temperature endothermic hydrocarbon conversion process carried out in the radiant-heating section of a tubular furnace, there will be a substantial temperature difference between the lowest temperature of the hot combustion products and the temperatures of the reactants in the tubes so that the efficiency of the furnace with respect to transfer of heat released to the conversion reaction per se will be low.

It is therefore an object of the invention to provide a process and apparatus for conducting endothermic hydrocarbon conversion reactions at elevated temperatures.

It is another object of the invention to provide a process and apparatus for conducting catalytic steam reforming of vaporous hydrocarbons in the production of hydrogen and carbon monoxide.

Still another object of the invention is to provide a process and apparatus by which the fuel consumption of a catalytic steam reforming furnace is reduced.

A further object of the invention is to provide a process and apparatus by which the efficiency of a catalytic steam reforming furnace with respect to the reforming reaction is increased.

Various other objects and advantages of the invention will appear from the following discussion and description.

In accordance with the process and apparatus of the invention, a reaction convection-heating section is included in the furnace. Only a portion of the hydrocarbons to be converted is passed in parallel to the tubes in the reaction radiant-heating section. The balance of the hydrocarbons to be converted is passed in parallel to tubes provided in the reaction convection-heating section. Hot combustion products from the reaction radiant-heating section are flowed through the reaction convection-heating section whereby additional heat is given up by the combustion gases to maintain the conversion reaction occurring in the tubes therein. The combustion gases accordingly leave the reaction sections of the furnace at substantially lower temperatures than in a furnace having only a reaction radiant-heating section. The efficiency of the furnace from the standpoint of utilization of combustion heat in the conversion reaction is thereby appreciably increased, making possible significant reductions in fuel consumption.

For a better understanding of the invention reference is had to the following detailed discussion and description which, taken with the accompanying drawing, respectively describes and illustrates a preferred embodiment of the invention.

Figure 1:
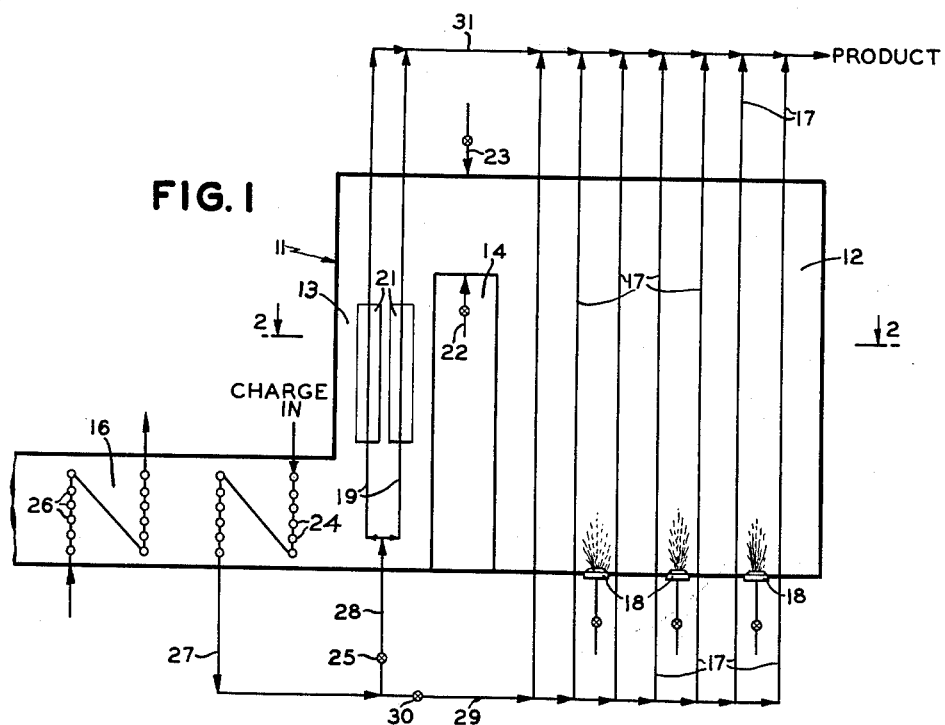

In the drawing, FIGURE 1 is a diagrammatic vertical transverse cross-section of a furnace adapted for the practice of a high-temperature endothermic hydrocarbon conversion process. FIGURE 2 is a diagrammatic cross-section of a portion of the furnace shown in FIGURE 1 taken along the line 2—2 thereof.

Referring now to the drawing, the reference character 11 indicates a box-type or rectangular furnace having a reaction radiant-heating section 12 and a reaction convection-heating section 13 separated by a bridge wall 14. A preheating section 16 for waste heat recovery is shown in FIG. 1 in open communication with reaction convection-heating section 13. Suitable flue gas exhaust means (not shown) are provided to receive combustion products from preheating section 16 for discharge to atmosphere. The walls, roofs and floor of furnace 11 can be constructed of any suitable refractory supported in any suitable way.

In reaction radiant-heating section 12 there are provided a plurality of substantially vertical reaction tubes 17 each containing suitable reforming catalyst. Burners 18 are provided in the floor of the reaction radiant-heating section of the furnace for supplying hot combustion products thereto. The burners can be located as desired to supply radiant heat uniformly to the reaction tubes. It is preferred to locate the burners in the floor, as shown, or in the wall opposite the bridge wall such that the burners fire between the rows of reaction tubes.

In reaction convection-heating section 13 there are also provided a plurality of substantially vertical reaction tubes 19 each containing reforming catalyst. Tubes 19 can be provided with suitable fins 21 over their lower portions, i.e., the portions below about the top of the bridge wall 14 to obtain high heat-transfer efficiency there. Where longitudinal plate-type fins are used, for example, between 6 and 24 fins are provided on each tube, each fin consisting of a plate with a thickness of $1/16$ to $1/8$ inch and a width of 2 to $2\frac{1}{2}$ inches. Other than the fact that the reaction tubes 19 can be finned, these tubes and reaction tubes 17 in the reaction radiant-heating section 12 are preferably substantially identical in materials of construction, diameter, length and catalyst inventory. Reaction tubes 17 and 19 can be supported in furnace 11 in any suitable way.

Means are shown at 22 and 23 for introducing dilution air into the furnace at the top of the bridge wall 14 and in the roof of furnace 11, respectively. Means 22 and 23 can be air doors or the like. Dilution air reduces the temperature of the hot flue gases passing from the reaction radiant-heating section 12 to reaction convection-heating section 13 and thereby permits control of the tube metal temperatures of reaction tubes 19.

Preheat section 16 is provided with two heating coils 24 and 26, each comprising a series of heating tubes with suitable return bends. Coil 24 is provided for preheating hydrocarbons and steam to be reformed in reaction sections 12 and 13 of the furnace. Steam can be generated in coil 26 for providing the steam requirements of the process and for other purposes. Additional heating coils for other services can also be provided. The heating coils 24 and 26 can be located in any suitable way in the path of the flue gases from the reaction convection-heating section to the stack.

In the operation of furnace 11, the hydrocarbons and steam to be reformed are introduced to coil 24 and are preheated to a temperature above about 600° F. by indirect heat exchange with hot combustion products. Preheated hydrocarbons and steam pass in conduits 27, 28 29 to reaction tubes 17 and 19, and flow in parallel upwardly in contact with reforming catalyst therein. Valves 25 and 30 in conduits 28 and 29, respectively, permit control of feed rates. Reaction tubes 19 in the reaction convection-heating section 13 preferably constitute between about 25 and about 40 percent of the total packed tubes. Since the rate at which reactants are introduced to each of the reaction tubes 17 and 19 is preferably substantially the same, between about 25 and about 40 percent of the preheated hydrocarbons and steam are passed to reaction tubes 19 in the reaction convection-heating section 13 and between about 75 and about 60 percent are passed to reaction tubes 17 in reaction radiant-heating section 12. Substantially the same conversion of hydrocarbons and stream to hydrogen and carbon monoxide in each of reaction tubes 17 and 19 is effected by indirect heat exchange with combustion products. Conversion products at a temperature preferably between about 1200° F. and about 1700° F. are then recovered in common conduit 31 and delivered to further processing.

The susbtantial heat requirements of the foregoing high-temperature endothermic reforming process are provided by the combustion of a fuel at burners 18 in the reaction radiant-heating section 12 of furnace 11. Any suitable fuel can be used, as for example, a gaseous hydrocarbon. In order to supply the endothermic heat of reforming to the reactants contacting reforming catalyst in reaction tubes 17 and to maintain the elevated effluent temperatures previously mentioned under the radiant-heating conditions of section 12, the hot combustion products from reaction radiant-heating section 12 are at a temperature above about 1700° F. These hot combustion products together with any dilution air introduced via means 22 and/or 23 then flow downwardly through reaction convection-heating section 13 in countercurrent indirect heat exchange with the upflowing hydrocarbons and steam in fined reaction tubes 19. The hot combustion products which have passed through reaction convection-heating section 13 are at a temperature below about 1500° F. and preferably between about 1200° F. and about 1400° F. These cooled combustion products or flue gases then pass through preheating section 16 under convection heating conditions to preheat the hydrocarbons and steam in coil 24 and to generate steam in coil 26.

In connection with tubular furnace reforming the control of tube metal temperatures is of substantial importance. In view of the elevated temperatures used and of the elevated pressures which can be used in reforming, the tubes must be of alloy materials for reasonable tube life. The maximum outside wall temperature (skin temperature) for reasonable tube life of stainless steel tubes which are ordinarily preferred is between about 1600° F. and about 1800° F. For this reason, the use of fins on re-reaction tubes 17 is precluded while their use on reaction tubes 19 is possible and preferred. In the case of reaction tubes 19 in the reaction convection section 13, permissible tube skin temperatures are not exceeded but are approached by the use of fins because the temperature of the hot combustion products in reaction convection section 13 is substantially lower than their temperature in reaction radiant section 12. As previously indicated, when the temperature of the hot combustion products from reaction radiant section 12 is so high as to cause excessive skin temperatures of finned reaction tubes 19 in the reaction convection section 13, dilution air is introduced to cool the hot combustion products to a safe temperature.

In some instances it is preferred to separately preheat the hydrocarbons and steam charged to the reaction tubes in the reaction sections of the furnace and suitable arrangements therefor are within the scope of the invention. In this connection various ways of supplying the feed hydrocarbons and steam to the several reaction tubes to insure uniform distribution are available, as by the use of restriction orifices of various sizes near the inlets of the reaction tubes.

Suitable reforming conditions in the reaction tubes include pressures from about atmospheric to about 350 p.s.i.g., inlet temperatures above about 600° F., outlet temperatures between about 1200° F. and about 1700° F., hydrocarbon space velocities above about 300 volumes of hydrocarbon, expressed as methane equivalent, per volume of reforming catalyst per hour, and steam-to-hydrocarbon ratios sufficient to avoid carbon formation on the catalyst. Any vaporous hydrocarbon can be reformed provided sufficient steam is supplied to avoid carbon formation, the required steam-to-carbon ratio for operability increasing with the molecular weight of the hydrocarbon. Generally, steam-to-carbon ratios above about 1.8 on a mol basis are preferred. The depth of hydrocarbon conversion is influenced by the catalyst used and the reforming conditions, particularly space velocity. Conditions can therefore be adjusted to obtain any desired depth of hydrocarbon conversion. In order to assure uniform heat distribution to the reaction tubes so that permissible tube wall temperatures in the furnace are not exceeded, reforming conditions in each of the reaction tubes are maintained substantially alike and the depth of conversion obtained in each is substantially the same. Any suitable reforming catalyst can be used, although commercial high nickel catalysts on inert supports are preferred.

As a specific example of a preferred embodiment of the invention and as an illustration of its advantages, reference is had to the following examples.

Example I

The furnace of this example is a standard box-type furnace having a reaction radiant-heating section and several convection-heating sections for preheating the natural gas feed and for generating steam. The reaction radiant-heating section is 43 feet wide, 41 feet long and 25 feet high. It contains 336 vertical reaction tubes of Inconel running the full height of the furnace and each uniformly packed with commercial nickel reforming catalyst in the form of ⅝-inch extrusions. The catalyst comprises about 20 percent nickel on an inert support. The outside diameter and wall thickness of each of the reaction tubes are 3½ inches and 0.28 inch, respectively. Approximately 14,710 lb./hr. of natural gas and 26,009 lb./hr. of steam are flowed in parallel downwardly through the reaction tubes. The tube inlet conditions include a temperature of 1000° F. and a pressure of 131 p.s.i.g. and the tube outlet conditions include a temperature of 1470° F. and a pressure of 125 p.s.i.g. The reaction heating duty of 57,794,000 B.t.u./hr. is supplied by burning natural gas at 25% excess air in the reaction radiant-heating section. The flue gas from the reaction radiant-heating section is at a temperature of 1760° F. Under these conditions, the required heat release by burning of fuel is 119.5 million B.t.u./hr. and the thermal efficiency of the reaction radiant-heating section is 48.4%. The overall furnace efficiency is raised to 85.2% by using the flue gases for waste-heat recovery as previously indicated. The composition of the reforming effluent is 51% $H_2$, 10% CO, 5.7% $CO_2$, 6.8% $CH_4$ and 26.5% $H_2O$, all percentages by volume.

Example II

The furnace of this example is constructed in accordance with the invention, as illustrated in the drawing. Reaction radiant-heating section 12 is 32 feet wide, 41 feet long and 25 feet high. Reaction convection-heating section 13 is 6 feet wide, 41 feet long and 25 feet high. 336 vertical reaction tubes of Inconel and of the same dimensions as the tubes in Example I running the full height of the furnace and each uniformly packed with the same commercial nickel reforming catalyst as used in Example I are also provided in this furnace, but in this case 240 of the reaction tubes are provided in reaction radiant-heating section 12 and the balance, or 96, are provided in reaction convection-heating section 13. Each of the 96 reaction tubes in reaction convection-heating section 13 is provided with 24 longitudinal fins, also of Inconel, extending over the lower 15 feet of the tube. Each fin is 1/16-inch thick and 2 inches wide. The height of bridge wall 14 is 15 feet. Feed rates of natural gas and steam, the tube inlet and outlet conditions, the reaction heating duty, and the effluent gas composition used and obtained with the furnace of this example are substantially identical with those of the furnace of Example I. However, in this example, the flue gas from reaction radiant-heating section 12 is at a temperature of 1860° F. and after passage through reaction convection-heating section 13 is at 1300° F. Under these conditions, the required heat release by burning of fuel is only 94.3 million B.t.u./hr. and the thermal efficiency of the two reaction sections of the furnace is 61.5%. It is noted that in Example II, the natural gas and steam flow upwardly through the reaction tubes.

Thus, by operation in accordance with the invention there is a net reduction in required heat release on the basis of the above comparative examples of 25.2 million B.t.u./hr., or about 21% less required in the furnace of Example II than in the furnace of Example I. This reduction in heat release translates directly into a corresponding reduction in fuel consumption. Of course, assuming comparable overall efficiencies of 85.2% based upon a flue gas temperature of 500° F. after waste heat recovery, there is an appreciable reduction in steam generation in the furnace of Example II over the furnace of Example I, but, as previously indicated, in many instances such a reduction in steam generation constitutes an important advantage.

Various alterations and modifications may be made to the foregoing preferred embodiment of the invention as will readily appear to those skilled in the art without departure from the spirit or scope of the invention.

I claim:

1. A method of conducting a high temperature endothermic hydrocarbon conversion reaction in a tubular furnace having a radiant-heating section and a convection-heating section which comprises passing one portion of the preheated hydrocarbon to be converted in parallel flow under conversion conditions through a plurality of tubular reaction zones in said radiant-heating section, passing another portion of the preheated hydrocarbons to be converted in parallel flow under conversion conditions through a plurality of tubular reaction zones in said convection-heating section, supplying radiant heat to said tubular reaction zones in said radiant-heating section and maintaining the effluents of said tubular reaction zones at outlet temperatures at least equal to the preheat temperature by burning a fuel in said radiant-heating section, supplying convection heat to said tubular reaction zones in said convection-heating section and maintaining the effluents of said tubular reaction zones at outlet temperatures at least equal to the preheat temperature by passing hot combustion products from said radiant-heating section through said convection-heating section, and recovering the effluents of all of said tubular reaction zones containing conversion products.

2. A process for the catalytic steam reforming of hydrocarbons in a tubular furnace having a radiant-heating section and a convection-heating section which comprises passing one portion of the preheated hydrocarbons to be reformed and steam in parallel flow under reforming conditions through a plurality of tubular reaction zones containing reforming catalyst in said radiant-heating section, passing another portion of the preheated hydrocarbons to be reformed and steam in parallel flow under reforming conditions through a plurality of tubular reaction zones containing reforming catalyst in said convection-heating section, supplying radiant heat to said tubular reaction zones in said radiant-heating section and maintaining the effluents of said tubular reaction zones at outlet temperatures at least equal to the preheat temperature by burning a fuel in said radiant-heating section, supplying convection heat to said tubular reaction zones in said convection-heating section and maintaining the effluents of said tubular reaction zones at outlet temperatures at least equal to the preheat temperature by passing hot combustion products from said radiant-heating section through said convection-heating section, and recovering the effluents of all of said tubular reaction zones comprising products of catalytic steam reforming.

3. A process for the catalytic steam reforming of hydrocarbons in a tubular furnace having a radiant-heating section and a convection-heating section which comprises preheating the hydrocarbons to be reformed to a temperature above about 600° F., passing one portion of said preheated hydrocarbons and steam in parallel flow under reforming conditions through a plurality of tubular reaction zones containing reforming catalyst in said radiant-heating section, passing another portion of said preheated hydrocarbons and steam in parallel flow under reforming conditions through a plurality of tubular reaction zones containing reforming catalyst in said convection-heating section, supplying radiant heat to said tubular reaction zones in said radiant-heating section and maintaining the effluents of said tubular reaction zones at outlet temperatures between about 1200° F. and about 1700° F. by burning a fuel in said radiant-heating section, supplying convection heat to said tubular reaction zones in said convection-heating section and maintaining the effluents of said tubular reaction zones at outlet temperatures between about 1200° F. and about 1700° F. by passing hot combustion products from said radiant-heating section through said convection-heating section, and recovering the effluents of all of said tubular reaction zones comprising products of catalytic steam reforming.

4. A process as defined in claim 3 in which the temperature of the hot combustion products from said radiant-heating section is above about 1700° F.

5. A process as defined in claim 4 in which said hot combustion products passed through said convection-heating section are cooled in said convection-heating section to a temperature below about 1500° F.

6. A process for the catalytic steam reforming of hydrocarbons in a tubular furnace having a radiant-heating section and a convection-heating section which comprises preheating the hydrocarbons to be reformed to a temperature above about 600° F., passing between about 60 and about 75 percent of said preheated hydrocarbons and steam in parallel flow under reforming conditions through a plurality of tubular reaction zones containing reforming catalyst in said radiant-heating section, passing the balance of said preheated hydrocarbons and steam in parallel flow under substantially identical reforming conditions through a plurality of tubular reaction zones containing reforming catalyst in said convection-heating section, supplying radiant heat to said tubular reaction zones in said radiant-heating section and maintaining the effluents of said tubular reaction zones at outlet temperatures between about 1200° F. and about 1700° F. by burning a fuel in said radiant-heating section, supplying convection heat to said tubular reaction zones in said convection-heating section and maintaining the effluents of said tubular reaction zones at substantially identical outlet temperatures by passing hot combustion products from said radiant-heating section through said convection-heating section and recovering the effluents of all of said tubular reaction zones comprising products of catalytic steam reforming.

7. A process for the catalytic steam reforming of hydrocarbons in a tubular furnace having a radiant-heating section and a convection-heating section which comprises preheating the hydrocarbons to be reformed to a temperature above about 600° F. by indirect heat exchange with flue gas, passing between about 60 and about 75 percent of said preheated hydrocarbons and steam in parallel flow under reforming conditions through a plurality of tubular reaction zones containing reforming catalyst in said radiant-heating section, passing the balance of said preheated hydrocarbons and steam in parallel flow under substantially identical reforming conditions through a plurality of tubular reaction zones containing reforming catalyst in said convection-heating section, supplying radiant heat to said tubular reaction zones in said radiant-heating section and maintaining the effluents of said tubular reaction zones at outlet temperatures between about 1200° F. and about 1700° F. by burning a fuel in said radiant-heating section, supplying convection heat to said tubular reaction zones in said convection-heating section and maintaining the effluents of said tubular reaction zones at substantially identical outlet temperatures by passing hot combustion products from said radiant-heating section through said convection-heating section, passing cooled combustion products from said convection-heating section as said flue gas to said preheating step, and recovering the effluents of all of said tubular reaction zones comprising products of catalytic steam reforming.

8. A furnace adapted for the catalytic steam reforming of hydrocarbons which comprises in combination a radiant-heating section and a convection-heating section separated by a bridge wall, a plurality of vertical heater tubes adapted to contain solid reforming catalyst disposed in said radiant-heating section, a plurality of vertical heater tubes adapted to contain solid reforming catalyst disposed in said convection-heating section, means for introducing a portion of the hydrocarbons to be reformed and steam to the tubes in said radiant-heating section, means for introducing the remainder of the hydrocarbons to be reformed and steam to the tubes in said convection-heating section, common means for recovering the effluents of the tubes in both of said sections, means for supplying hot products of combustion to said radiant-heating section for heating the tubes therein by direct radiant-heat, and means providing a passageway for removing hot products of combustion from said radiant-heating section and directing them to said convection-heating section.

9. A furnace adapted for the catalytic steam reforming of hydrocarbons which comprises in combination a radiant-heating section and a convection-heating section separated by a bridge wall, a plurality of vertical heater tubes adapted to contain reforming catalyst disposed in said radiant-heating section, a plurality of vertical heater tubes adapted to contain solid reforming catalyst disposed in said convection-heating section, means for introducing a portion of the hydrocarbons to be reformed and steam to the tubes in said radiant-heating section, means for introducing the remainder of the hydrocarbons to be reformed and steam to the tubes in said convection-heating section, common means for recovering the effluents of the tubes in both of said sections, means for supplying hot products of combustion to said radiant-heating section for heating and reforming the hydrocarbons and steam in the heater tubes therein by direct radiant heat and means providing a passageway for removing hot products of combustion from said radiant-heating section and directing them to said convection-heating section for heating and reforming the hydrocarbons and steam in the heater tubes therein.

10. A furnace as defined in claim 9 in which the heater tubes in the convection-heating section are finned over at least a portion of their length below the top of the bridge wall.

11. A furnace as defined in claim 9 in which the diameter and length of each of said heater tubes is identical and said plurality of vertical heater tubes in said convection-heating section constitute about 25 to about 40 percent of the total of heater tubes in said convection-heating section and said radiant-heating section.

12. A furnace for the catalytic steam reforming of hydrocarbons which comprises in combination a radiant-heating section and a convection-heating section separarated by a bridge wall, a preheating section in open communication with said convection-heating section, a plurality of vertical heater tubes adapted to contain solid reforming catalyst disposed in said radiant-heating section, a plurality of vertical heater tubes adapted to contain solid reforming catalyst disposed in said convection-heating section, preheater tubes in said preheating section, means for introducing the hydrocarbons to be reformed to said preheater tubes, means for passing a portion of the hydrocarbons preheated in said preheater tubes and steam to the heater tubes in said radiant-heating section, means for passing the remainder of the hydrocarbons preheated in said preheater tubes and steam to the heater tubes in said convection-heating section, common means for recovering the effluents of the tubes in both of said radiant-heating and convection-heating sections, means for supplying hot products of combustion to said radiant-heating section for heating the tubes therein by direct radiant-heat and means providing a passageway for removing hot products of combustion from said radiant-heating section and directing them successively to said convection-heating section and said preheating section.

13. A furnace adapted for the catalytic steam reforming of hydrocarbons which comprises in combination a radiant-heating section and a convection-heating section separated by a bridge wall, a preheating section in open communication with said convection-heating section, a plurality of vertical heater tubes adapted to contain solid reforming catalyst disposed in said radiant-heating section, a plurality of vertical heater tubes adapted to contain solid reforming catalyst disposed in said convection-heating section, preheater tubes in said preheating section, means for introducing hydrocarbons to be reformed into said preheater tubes, means for passing a portion of the hydrocarbons preheated in said preheater tubes and steam to the heater tubes in said radiant-heating section, means for passing the remainder of the hydrocarbons preheated in said preheater tubes and steam to the tubes in said convection-heating section, common means for recovering the effluents of the tubes in both of said radiant-heating and convection-heating sections, means for supplying hot products of combustion to said radiant-heating section for heating and reforming the hydrocarbons and steam in the heater tubes therein and means providing a passageway for removing hot products of combustion from said radiant-heating section and directing them to said convection-heating section for heating and reforming the hydrocarbons and steam in the heater tubes therein.

14. A method of conducting a high temperature endothermic catalytic hydrocarbon conversion reaction in a tubular furnace having a radiant-heating section and a convection-heating section which comprises passing one portion of the preheated hydrocarbon to be converted in parallel flow under conversion conditions through a plurality of tubular reaction zones containing conversion catalyst in said radiant-heating section, passing another portion of the preheated hydrocarbons to be converted in parallel flow under conversion conditions through a plurality of tubular reaction zones containing conversion catalyst in said convection-heating section, supplying radiant heat to said tubular reaction zones in said radiant-heating section and maintaining the effluents of said tubular reaction zones at outlet temperatures at least equal to the preheat temperature by burning a fuel in said radiant-heating section, supplying convection-heat to said tubular reaction zones in said convection-heating section and maintaining the effluents of said tubular reaction zones at outlet temperatures at least equal to the preheat temperature by passing hot combustion products from said radiant-heating section through said convection-heating section and recovering the effluents of all of said tubular reaction zones containing conversion products.

References Cited in the file of this patent
UNITED STATES PATENTS 1,782,171    Lattner ---------------- Nov. 18, 1930
1,915,363    Hanks et al. ------------ June 27, 1933